(12) United States Patent  (10) Patent No.: US 8,311,369 B2
Sambongi  (45) Date of Patent: Nov. 13, 2012

(54) METHOD AND APPARATUS FOR SEARCHING FOR IMAGES

(75) Inventor: Masao Sambongi, Hachiouji (JP)

(73) Assignee: Casio Computer Co., Ltd., Tokyo (JP)

( * ) Notice: Subject to any disclaimer, the term of this patent is extended or adjusted under 35 U.S.C. 154(b) by 947 days.

(21) Appl. No.: 12/369,178

(22) Filed: Feb. 11, 2009

(65) Prior Publication Data

US 2009/0202147 A1  Aug. 13, 2009

(30) Foreign Application Priority Data

Feb. 13, 2008 (JP) ................................ 2008-031250

(51) Int. Cl.
*G06K 9/54* (2006.01)

(52) U.S. Cl. ........ 382/305; 382/209; 382/219; 382/278; 358/403

(58) Field of Classification Search .............. 382/209, 382/219, 278, 305; 358/403
See application file for complete search history.

(56) References Cited

U.S. PATENT DOCUMENTS

| | | | | |
|---|---|---|---|---|
| 5,892,843 | A * | 4/1999 | Zhou et al. | 382/176 |
| 6,397,213 | B1 * | 5/2002 | Cullen et al. | 1/1 |
| 7,333,963 | B2 * | 2/2008 | Widrow et al. | 706/18 |
| 7,382,903 | B2 * | 6/2008 | Ray | 382/118 |
| 7,415,130 | B1 * | 8/2008 | Rundle et al. | 382/101 |
| 7,555,729 | B2 * | 6/2009 | Mifune et al. | 715/838 |
| 7,620,247 | B2 | 11/2009 | Matsushita et al. | |
| 7,660,445 | B2 * | 2/2010 | Ray | 382/118 |
| 7,680,360 | B2 * | 3/2010 | Nagamine et al. | 382/305 |
| 7,747,108 | B2 * | 6/2010 | Sato | 382/305 |

FOREIGN PATENT DOCUMENTS

| | | |
|---|---|---|
| JP | 2004-318365 A | 11/2004 |
| JP | 2006-146715 A | 6/2006 |
| JP | 2006-344155 A | 12/2006 |
| JP | 2007-128150 A | 5/2007 |
| JP | 2008-011316 A | 1/2008 |

OTHER PUBLICATIONS

Japanese Office Action dated Mar. 2, 2010 and English translation thereof issued in counterpart Japanese Application No. 2008-031250.

* cited by examiner

*Primary Examiner* — Yosef Kassa
(74) *Attorney, Agent, or Firm* — Holtz, Holtz, Goodman & Chick, PC (57) ABSTRACT

In a digital camera 4, when a shot image is chosen, fractal data expressing structural features of object images in the photographed image is obtained. The fractal data is sent to a search server 2. In the search server 2 are stored plural pieces of fractal data showing structural features of an image of a specific object and keywords expressing specific objects corresponding respectively to the plural pieces of fractal data. The search server 2 searches for images on the Internet 1 using as the keyword corresponding to the fractal data sent from the digital camera 4. Further, the search server 2 obtains fractal data of objects in the searched image, and calculates a degree of coincidence based on the similarity between the obtained fractal data and the fractal data sent from the digital camera 4, and successively sends the digital camera 4 the images whose degree of coincidence is larger than a certain reference.

6 Claims, 5 Drawing Sheets

METHOD AND APPARATUS FOR SEARCHING FOR IMAGES

BACKGROUND OF THE INVENTION

1. Field of the Invention

The present invention relates to a method and apparatus for searching for images similar to a certain image.

2. Description of the Related Art

As an example of a conventional technique used in cellular phones with a camera function, which can be connected to the Internet, a technique is disclosed in JP 2007-128150 A, which performs an optical character reading process (OCR process) on image data and uses resultant data (character information recorded as image data) as a search keyword to search for Web sites disclosing various sorts of information including characters. The technique does not require a user to manually input character information recorded as image data. Therefore, the user is allowed to search for keywords through Web sites without performing a troublesome input operation.

The technique uses the well known optical character reading technique (OCR technique) to read characters appearing in a photo, thereby automatically obtaining character information from image data, but cannot obtain character information from a photo, in which no character appears. Therefore, for example, when the user of the cellular phone shoots using a camera function of the cellular phone a photo in which no characters appear, and searches for images having contents similar to the photo on the Internet, the user is required to manually input keywords (character information) expressing contents of the photo. As a result, a disadvantage is invited that requires the user to execute troublesome manipulations.

The present invention has been made in consideration of the above problems involved in the conventional technique, and has an object to provide a method and apparatus for searching for images similar to a certain image in a simple manner.

SUMMARY OF THE INVENTION

According to one aspect of the invention, there is provided an image searching method of searching for images similar to a certain image stored as image data in a memory, which method comprises a first feature obtaining process comprising obtaining feature information showing features of the certain image from the image data, a specifying process comprising choosing and specifying feature information similar to the feature information obtained in the first feature obtaining process from among plural pieces of feature information stored in a storing unit, wherein the plural pieces of feature information show features of images of specific objects different from each other, and are associated with plural keywords expressing the specific objects respectively, and a searching process comprising searching for images similar to the image of the specific object using as a search keyword the keyword associated with the feature information specified in the specifying process.

According to another aspect of the invention, there is provided an image searching method of searching for images similar to a certain image stored as image data in a memory, which method comprises a receiving process comprising receiving feature information showing features of the certain image from an external apparatus, a specifying process comprising choosing and specifying feature information similar to the feature information received in the receiving process from among plural pieces of feature information stored in a storing unit in response to a request from the external apparatus, wherein the plural pieces of feature information show features of images of specific objects different from each other, respectively, and are associated with plural keywords expressing the specific objects respectively, a searching process comprising searching for images similar to the image of the specific object using as a search keyword the keyword associated with the feature information specified in the specifying process, and a sending process comprising sending the external apparatus the similar images found in the searching process.

According to still another aspect of the invention, there is provided an apparatus for searching for images similar to a certain image stored as image data in a memory, which apparatus comprises a feature obtaining unit for obtaining feature information showing features of the certain image, a storing unit for storing plural pieces of feature information and plural keywords associated with each other, wherein the plural pieces of feature information show features of images of specific objects different from each other respectively, and the plural keywords express the specific objects respectively, a specifying unit for choosing and specifying feature information similar to the feature information obtained by the feature obtaining unit from among the plural pieces of feature information stored in the storing unit, and a searching unit for searching for images similar to the image of the specific object using as a search keyword the keyword associated with the feature information specified by the specifying unit.

DETAILED DESCRIPTION OF THE PREFERRED EMBODIMENTS OF THE INVENTION

Now, embodiments of an image searching system according to the invention will be described with reference to the accompanying drawings. The image searching system puts an image searching method according to the invention into practice.

First Embodiment of the Invention

Figure 1:
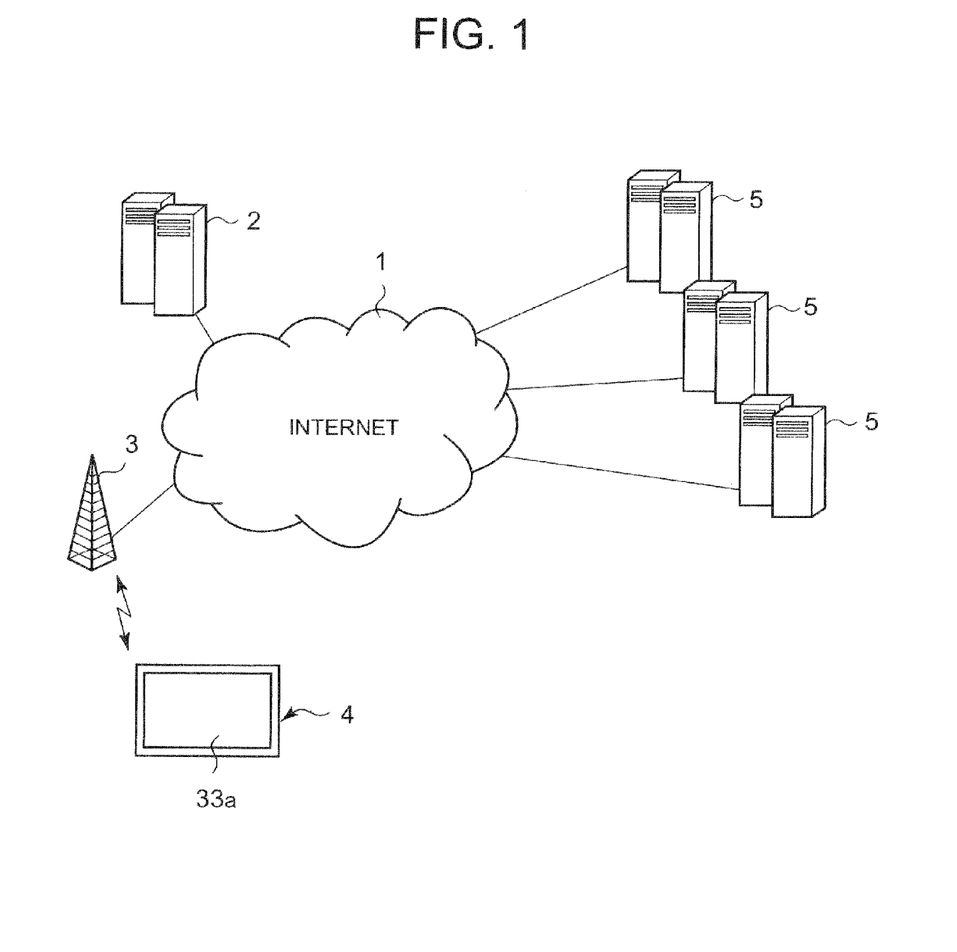
FIG. 1 is a view illustrating a system configuration of an image searching system in the first embodiment of the invention.

FIG. 1 is a view illustrating an example of a system configuration of the image searching system including image search terminals and search servers. The image searching system is capable of searching for images on the Internet 1 similar to an image shot by a user using a digital camera 4. As shown in FIG. 1, the image searching system comprises search servers 2 connected to the Internet 1, and digital cameras 4 with a radio communication function, which can be connected to the Internet 1 through a radio base station 3.

The radio base station 3 is a radio base station which serves, for example, as a commercial communication network (cellular phone network and PHS) and a public local area network (LAN). Plural image servers 5, 5, 5, . . . 5, which store various images therein are connected to the Internet 1. The image server 5 is Web server composing Web albums and/or Web server composing various Web sites having image information.

Figure 2:
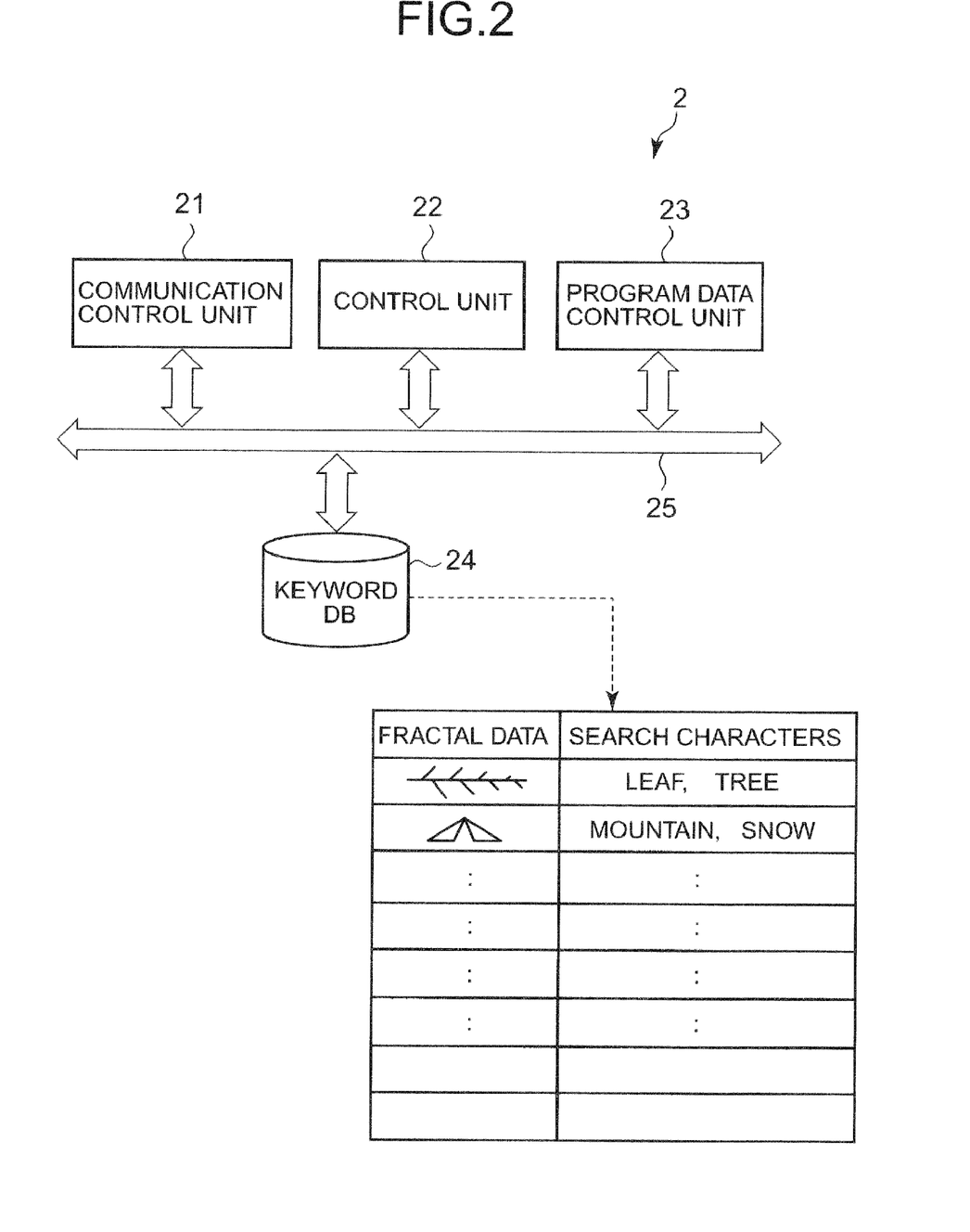
FIG. 2 is a block diagram illustrating a search server in the image searching system.

As shown in FIG. 2, the search server 2 comprises a communication control unit 21, control unit 22, program data storing unit 23 and keyword database (DB) 24, which are connected to each other through a system bus 25. The search server 2 provides image-search service.

The communication control unit 21 of the search server 2 is connected with the digital camera 4 and the image server 5 through the Internet 1 and exchanges data with these digital camera 4 and image server 5. An arbitrary storing apparatus is used as the keyword database 24, in which plural pieces of fractal data and keywords corresponding to the plural pieces of fractal data respectively are stored.

The fractal data includes feature information showing structural features of objects in an image which is obtained by shooting different objects such as leaf, trees, mountains, snow, etc. More specifically, the fractal data are parameter which are obtained by analyzing the object images as figures having a self-similarity. As an example of the parameter is a composition having a self-similarity which is observed at every magnifying power, when the object image is successively enlarged at plural magnifying powers. The keywords are character data such as "leaf", "tree", "mountain", "snow", etc.

The control unit 22 of the search server 2 controls operation of the communication control unit 21 in accordance with the program stored in the program data storing unit 23. Further, the control unit 22 searches for a keyword through the keyword database 24 and searches for an image using the searched keyword. In the search server 2, data stored in the program data storing unit 23 and keyword data base 24 are updated by other apparatus (not shown).

Figure 3:
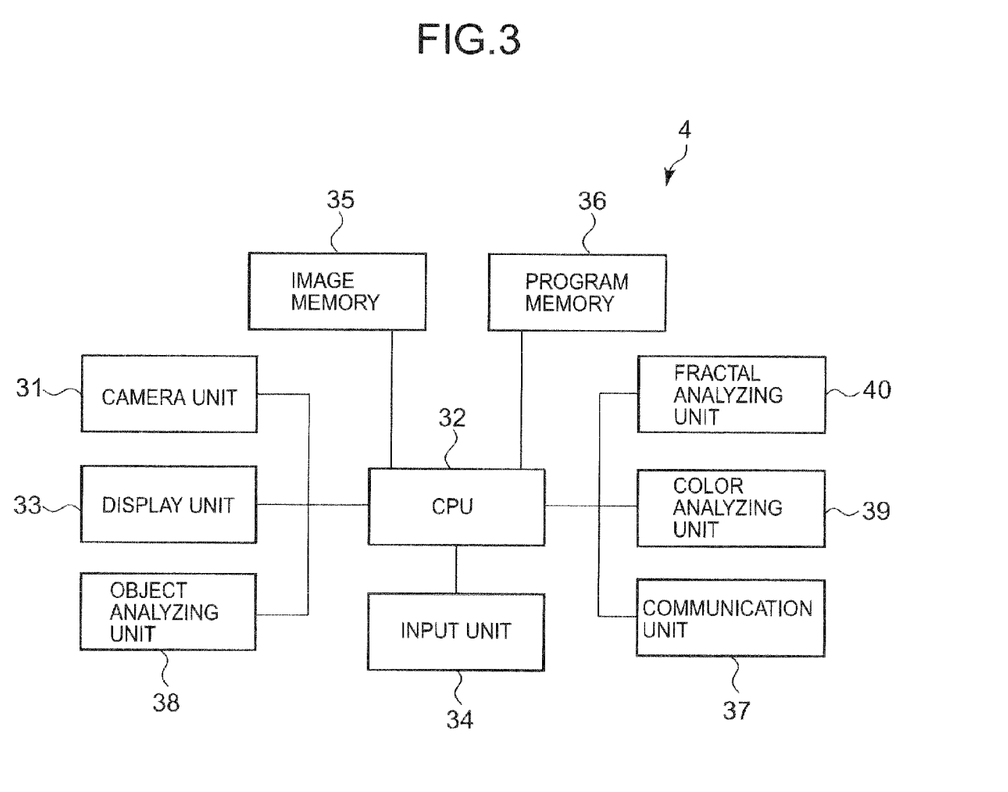
FIG. 3 is a block diagram illustrating a digital camera in the image searching system.

As illustrated in FIG. 3, the digital camera 4 comprises a camera unit 31, CPU 23, display unit 33, input unit 34, image memory 35, program memory 36, communication unit 37, object analyzing unit 38, color analyzing unit 39 and a fractal analyzing unit 40.

The camera unit 31 has an image pick-up element such as CCD and CMOS, and various signal processing circuits for processing a signal output from the image pick-up element. In the camera unit 31, the image pick-up element converts an optical image of an object focused in an optical system (not shown) into an image signal, and the signal processing circuit performs various signal processes on the image signal and outputs the processed image signal to CPU 32.

The image data of the object shot with the camera unit 31 is compressed into data in a predetermined format such as JPEG by CPU 32, and the compressed data is recorded as an image file in the image memory 35. A memory card detachably installed in the camera body and/or a data rewritable nonvolatile built-in memory are used as the image memory 35.

The display unit 33 of the digital camera 4 comprises LCD 33a (see FIG. 1) and a driving circuit. When the digital camera 4 is set to a shooting mode, the display unit 33 displays a shot object image, and when the digital camera 4 is set to a reproducing mode, the display unit 33 displays an image recorded in the image memory 35. The input unit 34 has plural switches including a power key, shutter key, mode switching key, etc., which are operated by the user.

The communication unit 37 of the digital camera 4 comprises an antenna, modulation/demodulation circuit, and an encoding/decoding circuit, wherein the antenna serves to send to or receive from the radio base station 3 a radio wave on which a digital signal is superimposed, and the modulation/demodulation circuit modulates the radio wave to be sent or demodulates the received radio wave, and further the encoding/decoding circuit encodes or decodes the digital signal. The communication unit 37 works under control of CPU 32 to exchange various sorts of data with the search servers 2 through the Internet 1, when an image searching operation is performed, as will be described later.

When an image is designated or chosen from among the images stored in the image memory 35 by the user, in accordance with instructions from CPU 32, the object analyzing unit 38 detects edges of the designated image and continuity of color of adjacent pixels, and recognizes an image based on a pattern matching technique, thereby analyzing respective objects within the designated image and setting an object area of each of analyzed objects.

In accordance with instructions from CPU 32, the color analyzing unit 39 analyzes a color of the object area set by the object analyzing unit 38 based on the image data, thereby obtaining color information indicating the color of whole area of each object area, and sending the color information to CPU 32.

Further, in accordance with instructions from CPU 32, the fractal analyzing unit 40 obtains fractal data of each object area based on image data of the object area set by the object analyzing unit 38 and sends the fractal data to CPU 32. The fractal data is similar to data stored in the search server 2. The fractal data is feature data showing structural features of an image within the object area and is also a parameter which is obtained by analyzing the object image in each object area as a figure having a self-similarity. As an example of the parameter, a composition is used, which has a self-similarity that is observed at every magnifying power, when each object image is successively enlarged at plural magnifying powers.

CPU 32 works in accordance with the program stored in the program memory 36 and key operations performed on the input unit 34, and controls operations of the units described above.

The program memory 36 comprises a rewritable memory such as EEPROM and a flash memory. In the program memory 36 are stored a program necessary for CPU 32 to control the operations of the units described above, and various sorts of data used in the above described operations of the object analyzing unit 38, color analyzing unit 39 and fractal analyzing unit 40. Further, in the program memory 36 is stored information relating settings of various functions of the digital camera 4.

Figure 4:
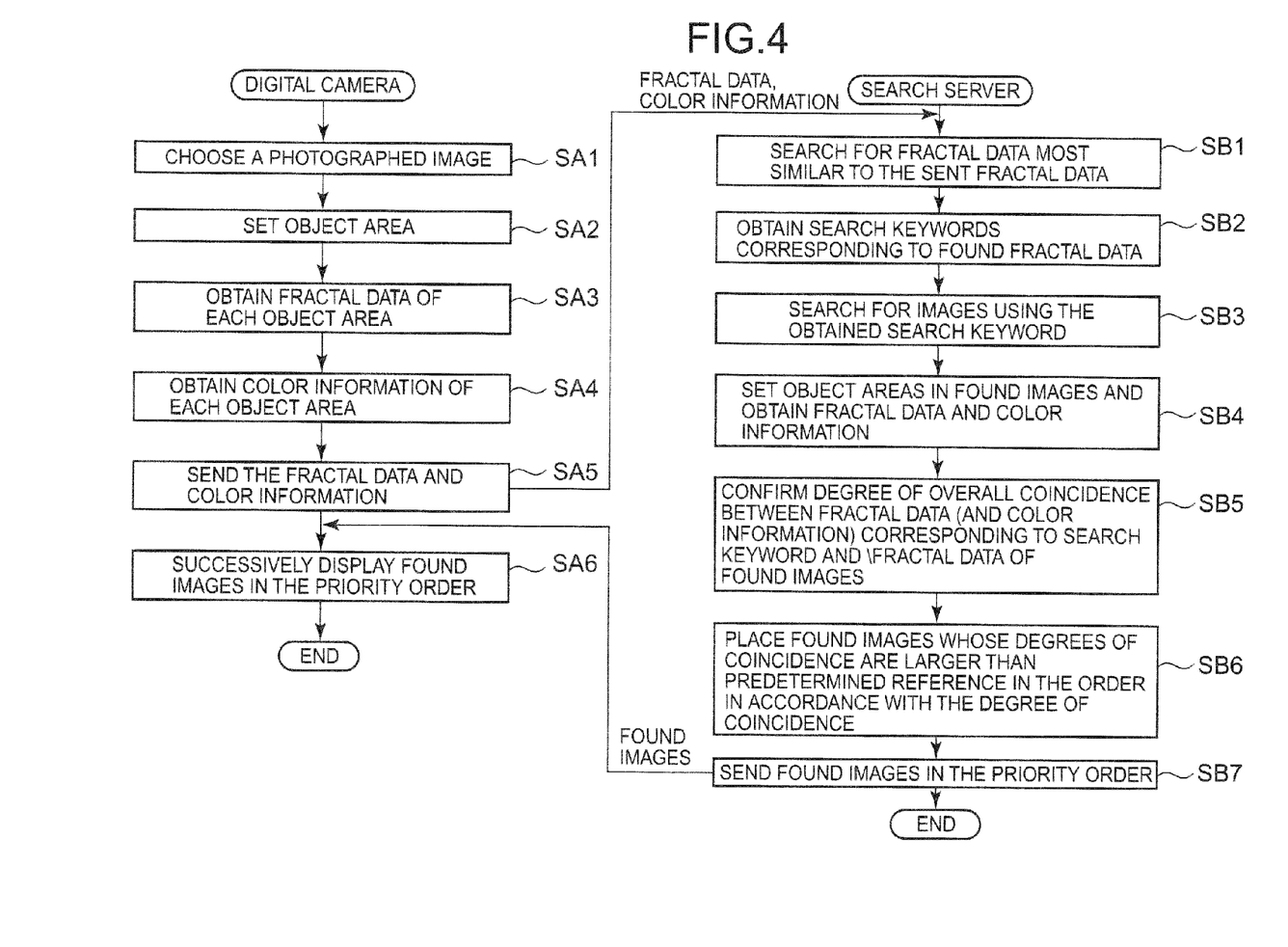
FIG. 4 is a flowchart of operation of the digital camera and search server in an image searching process.

Operations of the digital camera 4 and search server 2 in the image searching system shown in FIG. 1 will be described with reference to a flow chart shown in FIG. 4, which operations are performed when images similar to an image photographed with the digital camera 4 are searched for on the Internet 1.

In the digital camera 4, when an instruction of searching for an image is given in the reproducing mode in response to the user's key manipulation, a list of images stored in the image memory 35 are displayed on the display unit 33 (LCD 33a), or the images are successively displayed one by one in response to the user's key manipulation. The user is allowed to choose his or her desired image among the displayed images manipulating a predetermined key at step SA1 in FIG. 4.

The object analyzing unit 38 analyzes each object appearing in the chosen image and sets one or more object areas in each analyzed object at step SA2. The fractal analyzing unit 40 obtains fractal data from each object area at step SA3, and the color analyzing unit 39 also obtains color information from each object area at step SA4.

Thereafter, the communication unit 37 sends the obtained fractal data and color information of one or more object areas to the search server 2 at step SA5. When the fractal data and color information are sent, CPU 32 requests the search server 2 to search for images similar to the image which was chosen by the user at step SA1.

Then, in response to the request from the digital camera 4 of searching for similar images, the search server 2 searched for one or more pieces of fractal data which are most similar to one or more pieces of fractal data sent from the digital camera 4 respectively through the fractal data stored in the keyword database 24 at step SB1. One or more keywords corresponding to the found or searched fractal data are obtained and determined as search keywords at step SB2.

Further, the search server 2 searches for images on the Internet 1 using the determined search keywords at step SB3. In the present embodiment, a predetermined search engine using a text searching technique is used available on the Internet 1 for searching for an image. In other words, other apparatuses and system included in the image search engine are used to search for images relating to the search keywords through the images stored in the plural image servers 5, 5, 5, . . . 5 shown in FIG. 1, and obtains data of the searched, or found images. When plural keywords are determined at step SB2, images including all the search keywords are searched for.

The search server 2 sets object areas in each of one or plural searched or found images (searched image) and obtains fractal data and color information from each object area at step SB4 in the same way as in the digital camera 4. The search server 2 judges based on a predetermined reference a degree of coincidence (first degree of coincidence) between the fractal data corresponding to the search keyword and the fractal data obtained from the searched image and further judges a degree of coincidence (second degree of coincidence) between the color information sent from the digital camera 4 and the color information obtained from the searched image, and calculates a degree of overall coincidence of each search image using the first and second degrees of coincidence at step SB5. The degree of coincidence is expressed in numerals.

The search server 2 assigns a priority order to the searched image whose degree of overall coincidence is larger than a predetermined reference (choosing process) at step SB6, and sends back to the digital camera 4 the results of the image search process, that is, successively sends to the digital camera 4 the searched images with the priority order assigned in the priority order at step SB7.

The digital camera 4 receives the searched images whose degree of overall coincidence is more than a predetermined reference in the priority order, and displays on LCD 33a the received searched images in the priority order at step SA6. More specifically, a list of received searched images arranged in the receipt order are displayed and/or the received searched images are successively displayed one by one in response to the user's key manipulation.

The following modification may be made to the image searching system described above, wherein the digital camera 4 obtains appearance information (for example, information concerning a shape of an object) of the object with respect to each object area, and sends to the search server the appearance information together with the fractal data and color information, and the search server 2 calculates a degree of coincidence of the obtained search image based, on the appearance information, thereby obtaining the final result of the image search. In this case, an accuracy of the similar image search is further improved.

If a case is acceptable for the user, in which plural images are obtained as the final result of the image search, the search server 2 can omit the choosing process, that is, the search server 2 makes no judgment on coincidences (first and second degree of coincidence) with respect to the fractal data and color information, or may make judgment only based on the fractal data or only based on the color information. When the judgment is made only based on the fractal data, a process for obtaining the color information at step SA4 is not necessary in the digital camera 4. In this case, the user also can enjoy user-friendliness of the digital camera 4 in searching for his or her desired similar images as in the first embodiment.

In the present embodiment, the digital camera 4 has been described, in which the object areas are set in the image shot and chosen by the user and the fractal data and color information of each object area are obtained, and the obtained fractal data and color information are sent to the search server 2. A modification may be made to the first embodiment, wherein the digital camera 4 sends an image to the search server 2 but does not obtain fractal data and color information of the image, and instead the search server 2 sets object areas in the image sent from the digital camera 2 and obtains fractal data and color information of each object area.

In the modification, the digital camera 4 does not send the image without reducing in size but reduces the image size beforehand enough to the extent that the fractal data and color information can be obtained therefrom and sends the reduced image to the search server 2, whereby a data amount to be sent to the search server 2 can be decreased.

When the search server 2 omits the choosing process or makes judgment only based on fractal data, the digital camera 4 sets object areas in the photographed image and extracts from the photographed image image information (for example, binary information) at least necessary for obtaining fractal data, and sends the extracted image information to the search server 2, and the search server 2 obtains fractal data from the received image information, whereby a data amount to be sent to the search server 2 can be further reduced.

In the present embodiment, the image search performed by the search server 2 has been described, which search server 2 uses an image search engine available on the Internet, but a search server itself having a function of an image search engine may be used. Further, a search server may be used, which itself has an image database storing plural images associated with one or more keywords, wherein in response to a request from the digital camera 4, images are searched for only through the images stored in the image database.

In the present embodiment, the digital camera 4 which can be connected to the Internet 1 is described as an example of the image searching terminal, but a cellular phone, whether or not it has a camera function, may be used as the image searching terminal in the present invention.

The image searching terminal and search server are only required to communicate or exchange data with each other. In this case, it is not important whether data is exchanged through radio communication or wired communication. Either the Internet 1 or a special network may be used for data communication.

Second Embodiment of the Invention

The second embodiment of the invention will be described. In the first embodiment of the invention, the image searching system putting the image searching method of the invention into practice is described, in which system the search server 2 and digital camera 4 are used. An image searching method according to the second embodiment of the invention may be put into practice with a single apparatus.

For example, in a digital camera having substantially the same configuration as the digital camera 4, a control programs plural pieces of fractal data expressing structural features of an object, and keywords corresponding respectively to the plural pieces of fractal data are stored in the program memory 36, and images are searched for only in the digital camera, wherein the control program is used for performing the image searching operation and choosing operation of the final search result, which are performed in the search server 2 in the first embodiment.

Figure 5:
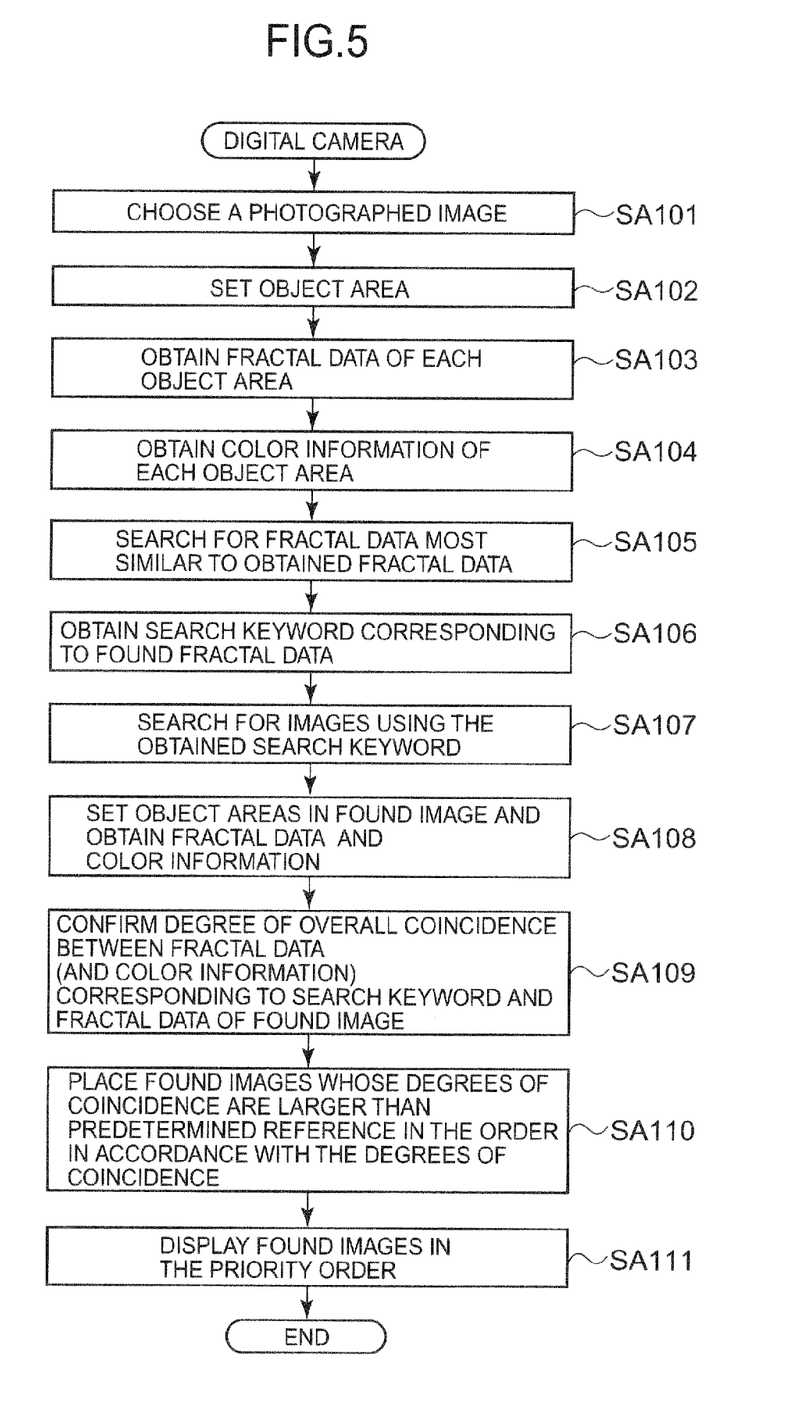
FIG. 5 is a flow chart of operation of a digital camera in the second embodiment of the invention.

FIG. 5 is a flowchart of an image searching operation of the digital camera. As shown in FIG. 5, the image searching operation and choosing operation performed by the search server 2 are performed at steps SA105 to SA110 in FIG. 5. Processes at steps SA101 to SA104 in FIG. 5 are the same as the processes at steps SA1 to SA4 in FIG. 4. A process at step SA111 corresponds to the process at step SA6 in FIG. 4.

Contents of the image searching operation and choosing operation performed by the search server 2 using on the keywords in the first embodiment are applied to the digital camera in the second embodiment.

Similar images to be searched for are not restricted to images on the Internet 1 but images photographed with the digital camera and stored in the image memory 35 may be included in those to be searched for. In this case, a digital camera having no communication unit 37 (see FIG. 3), that is, a digital camera with no communication function for connecting to the Internet 1 may be used.

What is claimed is:

1. An image searching method of searching for images similar to a certain image stored as image data in a memory, the method comprising:
   a first feature obtaining process comprising obtaining feature information showing a feature of the certain image from the image data;
   a specifying process comprising choosing and specifying feature information similar to the feature information obtained in the first feature obtaining process from among plural pieces of feature information stored in a storing unit, wherein the plural pieces of feature information show features of images of specific objects that are different from each other, and are associated with plural keywords expressing the specific objects respectively;
   a keyword obtaining process comprising obtaining a keyword associated with the specified feature information, and determining the obtained keyword as a search keyword; and
   a searching process comprising searching for images similar to the image of the specific object using the determined search keyword.

2. The image searching method according to claim 1, further comprising:
   a setting process comprising setting an object area in the certain image, from which the feature information is to be obtained in the first feature obtaining process,
   wherein the first feature obtaining process obtains fractal data comprising figure information as the feature information, which figure information has a self-similarity of an image within the object area set in the setting process.

3. The image searching method according to claim 1, further comprising:
   a second feature obtaining process comprising obtaining feature information of the similar image found in the searching process;
   an ordering process comprising placing plural similar images found in the searching process in order in accordance with first degrees of similarity, wherein the first degrees of similarity are decided based on the feature information obtained in the first feature obtaining process and the feature information obtained in the second feature obtaining process; and
   a displaying process comprising displaying the plural similar images placed in the order determined in the ordering process.

4. The image searching method according to claim 3, further comprising:
   a first color information obtaining process comprising obtaining color information showing color of the certain image from the image data; and
   a second color information obtaining process comprising obtaining color information showing color of the similar image found in the searching process,
   wherein the ordering process places the plural similar images found in the searching process in order in accordance with the first degrees of similarity and second degrees of similarity, wherein the second degrees of similarity are decided based on the color information obtained in the first color information obtaining process and the color information obtained in the second color information obtaining process.

5. An image searching method of searching for images similar to a certain image stored as image data in a memory, the method comprising:
   a receiving process comprising receiving feature information showing a feature of the certain image from an external apparatus;
   a specifying process comprising choosing and specifying feature information similar to the feature information received in the receiving process from among plural pieces of feature information stored in a storing unit in response to a request from the external apparatus, wherein the plural pieces of feature information show features of images of specific objects that are different from each other, respectively, and are associated with plural keywords expressing the specific objects respectively;
   a keyword obtaining process comprising obtaining a keyword associated with the specified feature information, and determining the obtained keyword as a search keyword;
   a searching process comprising searching for images similar to the image of the specific object using the determined search keyword; and
   a sending process comprising sending the external apparatus the similar images found in the searching process.

6. An apparatus for searching for images similar to a certain image stored as image data in a memory, comprising:

a feature obtaining unit which obtains feature information showing a feature of the certain image;

a storing unit which stores plural pieces of feature information and plural keywords respectively associated therewith, wherein the plural pieces of feature information show features of images of specific objects that are different from each other, respectively, and the plural keywords express the specific objects respectively;

a specifying unit which chooses and specifies feature information similar to the feature information obtained by the feature obtaining unit from among the plural pieces of feature information stored in the storing unit;

a keyword obtaining unit which obtains a keyword associated with the specified feature information, and which determines the obtained keyword as a search keyword; and a searching unit for searching for images similar to the image of the specific object using the determined search keyword.

\* \* \* \* \*